(12) United States Patent
Pollock et al.

(10) Patent No.: US 9,384,467 B2
(45) Date of Patent: Jul. 5, 2016

(54) PROVIDING ACTIONABLE NOTIFICATIONS TO A USER

(71) Applicant: Google Inc., Mountain View, CA (US)

(72) Inventors: Xander Pollock, Palo Alto, CA (US); Dorington George Little, IV, San Francisco, CA (US)

(73) Assignee: Google Inc., Mountain View, CA (US)

( * ) Notice: Subject to any disclaimer, the term of this patent is extended or adjusted under 35 U.S.C. 154(b) by 763 days.

(21) Appl. No.: 13/719,162

(22) Filed: Dec. 18, 2012

(65) Prior Publication Data

US 2015/0169137 A1 Jun. 18, 2015

(51) Int. Cl.
*G06F 13/00* (2006.01)
*G06F 15/00* (2006.01)
*G06Q 10/10* (2012.01)

(52) U.S. Cl.
CPC ..................................... *G06Q 10/10* (2013.01)

(58) Field of Classification Search
CPC ............................. G06Q 10/109; G06Q 30/08
USPC ......................... 715/808, 762–765, 841, 761
See application file for complete search history.

(56) References Cited

U.S. PATENT DOCUMENTS

| 7,376,579 | B2 | 5/2008 | Hack et al. |
| 2002/0035500 | A1 | 3/2002 | Yoko et al. |
| 2011/0071893 | A1* | 3/2011 | Malhotra et al. ........... 705/14.23 |
| 2013/0073329 | A1* | 3/2013 | Shoham et al. .............. 705/7.18 |
| 2013/0316313 | A1* | 11/2013 | Darrow ........................ 434/236 |
| 2014/0189017 | A1* | 7/2014 | Prakash et al. ................ 709/206 |
| 2014/0297384 | A1* | 10/2014 | Blach et al. ................ 705/14.27 |

* cited by examiner

*Primary Examiner* — Kevin Nguyen
(74) *Attorney, Agent, or Firm* — Dority & Manning, P.A.

(57) ABSTRACT

A system and machine-implemented method for providing a user with a to-do list of tasks, the method including determining one or more goals associated with a user, the one or more goals including objectives that the user wants to achieve, identifying one or more notifications associated with the user, each notification notifying the user of an event comprising an action by another user with respect to the user, identifying one or more tasks, the one or more tasks contributing to at least one of the one or more goals and providing a response to the event relating to at least one of the one or more notifications and providing the one or more tasks for display to the user.

17 Claims, 7 Drawing Sheets

PROVIDING ACTIONABLE NOTIFICATIONS TO A USER

BACKGROUND

Notifications regarding user activity may be provided to a user, notifying the user of various events occurring or being scheduled to occur that relate to the user. These notifications are typically not linked to specific tasks by the user and typically do not provide guidance to the user regarding the significance of the event. Additionally, a user may be provided with a list of tasks (e.g., a to-do list) which may provide the user with reminders regarding tasks the user needs to complete. Typically, the list includes tasks entered by the user manually.

SUMMARY

The disclosed subject matter relates to a machine-implemented method for providing a user with a to-do list of tasks, the method comprising determining one or more goals associated with a user, the one or more goals comprising objectives that the user wants to achieve. The method further comprising identifying one or more notifications associated with the user, each notification notifying the user of an event comprising an action by another user with respect to the user. The method further comprising identifying one or more tasks, the one or more tasks contributing to at least one of the one or more goals and providing a response to the event relating to at least one of the one or more notifications and providing the one or more tasks for display to the user.

The disclosed subject matter also relates to a system for providing a user with a to-do list of tasks, the system comprising one or more processors and a machine-readable medium comprising instructions stored therein, which when executed by the processors, cause the processors to perform operations comprising determining one or more goals associated with a user, the one or more goals comprising objectives that the user wants to achieve. The operations further comprising identifying one or more notifications associated with the user, each notification notifying the user of an event comprising an action by another user with respect to the user. The operations further comprising mapping the one or more notifications to one or more of the one or more goals, wherein a notification is mapped to a goal when one or more of the event corresponding to the notification or response to the event corresponding to the notification contribute to achieving the goal. The operations further comprising identifying one or more tasks, wherein the one or more tasks comprise at least one task that provides a response to a notification mapped to at least one of the one or more goals and providing the one or more tasks for display to the user.

The disclosed subject matter also relates to a machine-readable medium comprising instructions stored therein, which when executed by a machine, cause the machine to perform operations comprising determining one or more goals associated with a user, the one or more goals comprising objectives of the user that the user wants to achieve. The operations further comprising identifying one or more notifications associated with the user, each notification notifying the user of an event comprising an action by another user with respect to the user. The operations further comprising identifying one or more tasks, the one or more tasks each contributing to at least one of the one or more goals or providing a response to the event relating to at least one of the one or more notifications and providing the one or more tasks for display to the user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
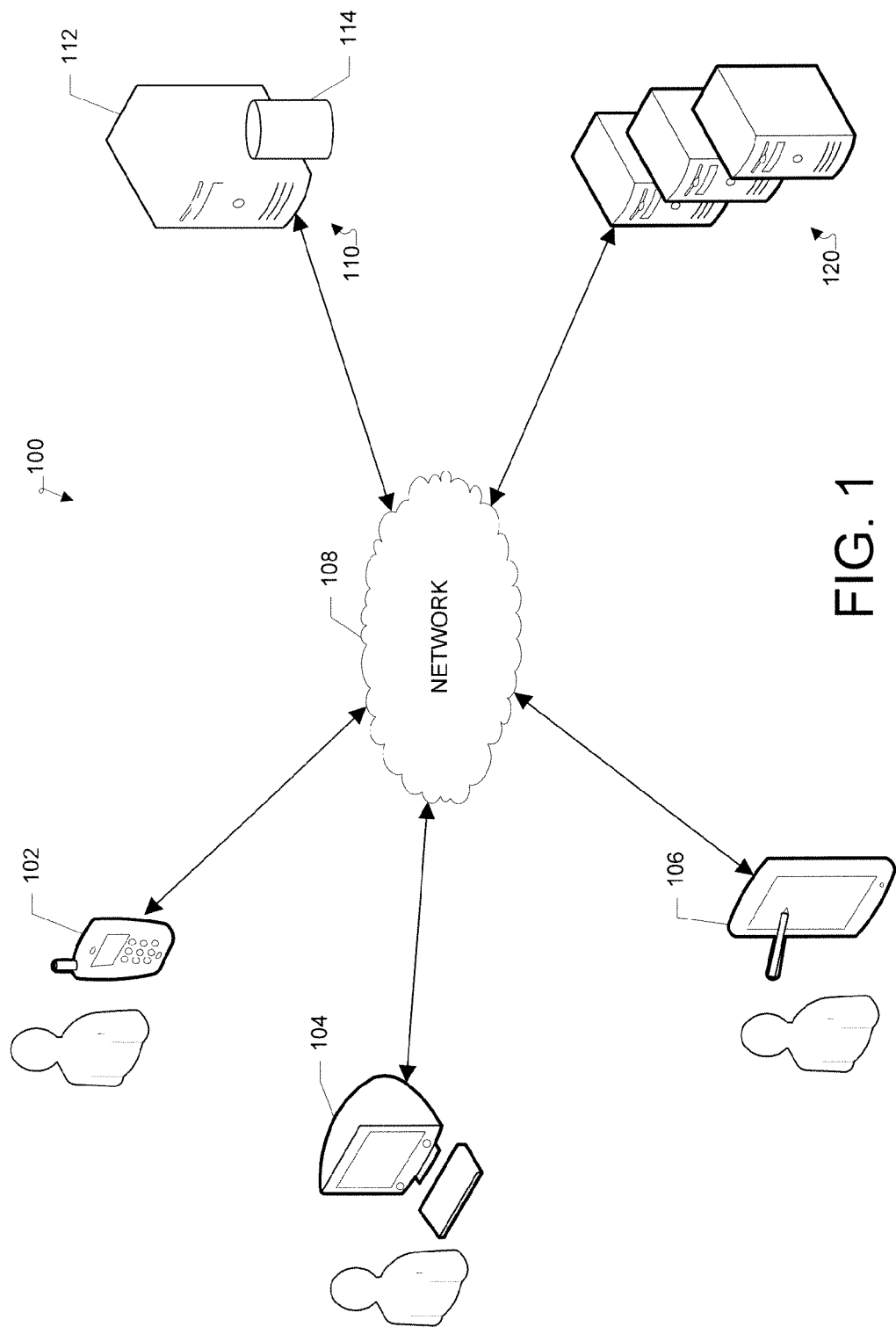
FIG. 1 illustrates an example client-server network environment which provides for providing a user with a to-do list of tasks.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

I. Overview

The subject disclosure provides a system and method for providing actionable notifications to a user. Actionable notifications may be provided to the user as a goal-oriented predictive to-do list generated for a user (e.g., a business owner). The to-do list may be generated based on notifications and goals of the user. Notifications provide the user with an indication of an activity by another user (e.g., a consumer, a contact of the user, etc.) relating to the user or the user's business. Goals relating to a user include both goals/objective specified by the user that the user wants to achieve with respect to his/her business as well as goals determined by the system based on information regarding the user (or user's business). The system maps events occurring with respect to the user detected as notifications (e.g., performed by other users) with actionable tasks that help a user reach their specified goals. Additionally, the system may provide the user with a recommendation of appropriate tools (e.g., applications) to perform the tasks.

In one example, the user (e.g., business owner) initially selects one or more goals. In one implementation, a listing of possible goals may be provided to a user and the user may select from the goals. In one example, the goals provided for selection to the user may be selected based on various information and/or activity of the user (e.g., user and business information, user and business historical activity). The user may select one or more goals. In addition the system may select one or more goals and objectives for the user based on information regarding the user or the user's business.

Based on the user goals, including user selected goals and/or system selected goals, as well as the notifications of events relating to the user, the system may identify a set of tasks for the user. The recommended tasks include tasks that relate to notifications indicating events that occur with respect to the user and help the user reach the specified goals.

The mapping of tasks to specific goals may be based on various information and/or user input. In one example, historical information regarding tasks (e.g., with respect to the user, or other users) may be used to map tasks to goals. Tasks may be user-initiated tasks (e.g., tasks that are to be performed by the user and are not necessarily in response to other activity or events), or event-initiated tasks (e.g., tasks that are suggested to a user in response to an event, such as, an event indicated by a notification sent to the user).

Similarly, notifications may be mapped to goals. The mapping may be performed using same or similar information. In some implementations, notifications to be displayed to the user and/or tasks to be performed by the user may be ranked according to the goals of the user. Notifications received and ready to be displayed to the user may be ranked and/or filtered in a similar manner, according to the goals of the user. That is, the system may determine when and how notifications are displayed to the user (e.g., including task suggestions relating to the notifications) according to the importance of the notification and/or related tasks to the specified goals and/or objectives of the user. Tasks that provide an appropriate response to the notification may then be identified for recommendation to the user. Tasks (e.g., tasks the user has entered, and/or the system has recommended to the user for example in response to a notification), may also be ranked according to the goals provided by the user, and may provide a to-do list to the user according to the ranking. In one example, various tasks may be included in the list according to whether they are determined to be important (e.g., ranked high) in reaching a specified goal and/or objective of the user. Each task may be selected based on various criteria including the priority associated with each goal mapped to the task, the number of goals mapped to the task, the number of notifications relating to the task, the importance of each notification relating to the task, as well as other contextual or user information including preferences of the user, resources available to the user, etc.

In one example, tasks may be also ranked and/or selected based on previous activity of the user (or other users) with respect to previous to-do tasks relating to a specific goal or objective and/or with respect to more than one goals or objective. In one example, the user activity, such as entry, selection and/or performance of a to-do task (e.g., a recommended to-do task or a user-generated to-do task) and/or feedback regarding certain to-do tasks may be used when recommending tasks, including, for example, the prioritization of goals. For example, whether the user selects and/or performs a recommended task may be taken into account when recommending tasks (e.g., the same or similar task) to the user in the future.

Based on the ranking of tasks and other information available a list of to-do list of tasks may be generated. The list of to-do list of tasks is provided for the display to the user and the user may select to perform one or more of the to-do tasks. The to-do list may be dynamically updated based on new events (e.g., notifications received by the user and/or activity of the user).

In some implementation, one or more tools may be suggested to the user for each task. The user may receive suggested tools, for example, once the user selects a task. In one example, in addition to providing the user with a tool to perform the task, the system may further provide relevant content for performing the task. In one implementation, once the user selects a task the user may be directed to an appropriate application (e.g., selected by the user from one or more tools suggested to the user, and/or automatically selected by the system based on various criteria). Additionally, once the application is launched, relevant content regarding the task may be provided to the application (e.g., automatically) to help the user in performing the task.

II. Example Client-Server Network Environments for Facilitating Providing a User with a To-do List of Tasks FIG. 1 illustrates an example client-server network environment which provides for providing a user with a to-do list of tasks. A network environment 100 includes a number of electronic devices 102, 104 and 106 communicably connected to a server 110 by a network 108. One or more remote servers 120 are further coupled to the server 110 and/or the one or more electronic devices 102, 104 and 106. Server 110 includes a processing device 112 and a data store 114. Processing device 112 executes computer instructions stored in data store 114, for example, to assist in providing a list of to-do tasks to a user at one or more of the electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 102, 104 and 106 store a user agent such as a browser or application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the application for providing the user with a to-do list of tasks (e.g., electronic devices 102, 104 or 106).

Each of the one or more remote servers 120 can be a single computing device such as a computer server or can represent more than one computing device working together to perform the actions of a server computer (e.g., cloud computing). Each of the one or more remote servers 120 may host one or more social networking services or other services providing notifications to the system (e.g., hosted at server 110). In one embodiment server 110 and one or more remote servers 120 may be implemented as a single server. In one example, the server 110 and one or more remote servers 120 may communicate through the user agent at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
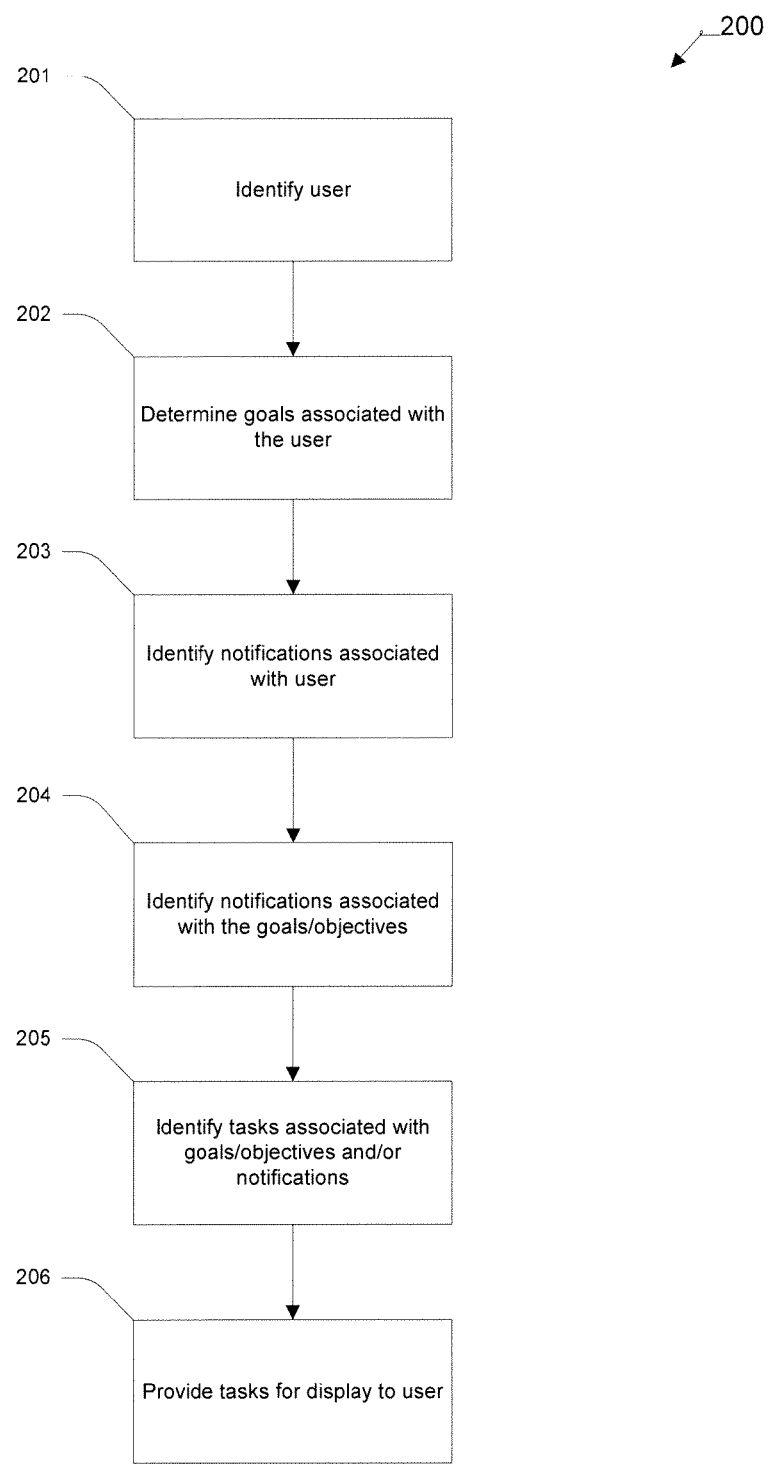
FIG. 2 illustrates a flow diagram of an example process for providing a user with a to-do list of tasks.

III. Example Processes for Facilitating a Providing a User with a to-do List of Tasks FIG. 2 illustrates a flow diagram of an example process 200 for providing a user with a to-do list of tasks. The to-do list of tasks is provided to the user based on one or more of user goals and events relating to the user (e.g., represented by notifications). In block 201, a user is identified as requesting to be provided with a to-do list of tasks. In one example, the user (e.g., at a client device 102, 104 or 106) is identified when the user first opens and/or logs into the application (e.g., hosted by server 110). In another example, the user is identified when the user first opens an account or otherwise signs up to be provided with the to-do list of tasks on a one-time or ongoing basis. Once the user is identified, in block 201, information regarding the user, including user preferences, activity history, type of business, business category, business activity, customer preferences and activity history, resources available to the user, information regarding the user's customers (e.g., demographics), and/or other similar information. In one example, such information may be stored in one or more profiles (e.g., a user profile and/or a business profile), or may be determined based on unstructured information regarding the user and/or the business of the user.

Figure 4A:
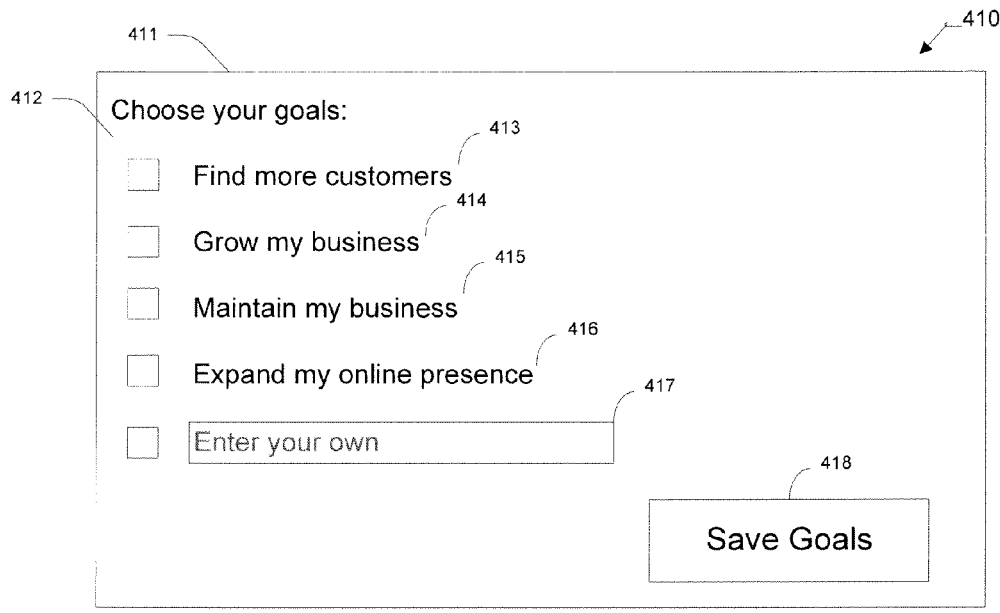
FIGS. 4A-4F illustrate example graphical user interfaces that may be displayed to the user to provide the user with a to-do list of tasks.
Figure 4B:
Figure 4C:
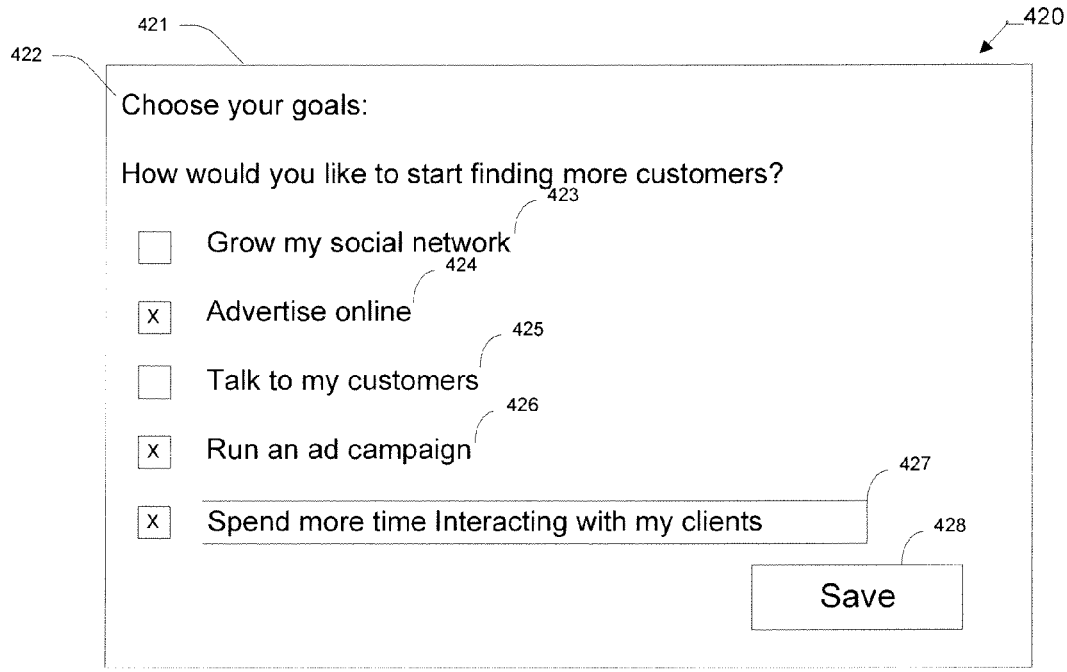
Figure 4D:

In block 202, one or more goals associated with the user are determined. In one example, the user is provided with one or more goals typically associated with a business and may select from the goals. In another example, the user may enter one or more goals manually. FIGS. 4A and 4D, described in more detail below, illustrates an example graphical user interface that may be presented to the user to allow the user to select one or more goals or enter his/her own goals. In one example, one or more goals may be automatically determined for the user based on information regarding the user and/or the business of the user. In one example, the determined goals may be provided to the user for selection, or may be added as additional goals. In one example, one or more goals may be associated with a priority, the priority indicating the importance of the goal to the user or the business of the user. The priority or importance associated with a goal may be determined based on information regarding the user or the business of the user.

Once the user indicates at least one goal, the user may be further prompted to determine sub goals referring a specific method (e.g., a task or specific tool or mechanism) for performing a goal. In one example, the user may be presented with sub goals presented to the user for selection and/or the user may further manually enter one or more mechanisms or sub goals for achieving the goal. FIGS. 4B and 4C, described in more detail below, illustrate example user interfaces that may be displayed to a user to select sub goals associated with a goal.

In block 203, one or more notifications associated with the user are identified. In one example, the notifications include one or more notifications of events. Events represent actions by one or more other users with respect to the user and/or the business of the user. In one example, the other users may include contacts of the user at one or more social networking services. In one example, the actions include social activity performed by one or more users with respect to the business or the user. The activities that result in notifications may include messages, comments, endorsements, tags, recommendations, shares, reviews or other similar actions with respect to the business and/or the user. In one example, after the notifications are identified, in block 204, one or more of the identified notifications are mapped to specific goals/sub goals associated with the user (e.g., the goals and/or sub goals determined in block 202). In one example, a notification is mapped to a specific goal and/or sub goal, if the notification prompts an action by the user (or some other user associated with the business) that would contribute in achieving the goal and/or sub goal.

In block 205, one or more tasks are identified that are related to the one or more notifications identified in block 203 and one or more goals (e.g., including sub goals) identified in block 202. In one example, tasks are identified that are mapped to one or more goals and/or relate to notifications mapped to those goals. In one example, one or more tasks are selected that would achieve one or more of the goals and/or sub goals and may also additionally provide a response to an event provided as a notification to the user. In one example, the selection of the one or more tasks may be made from a plurality of tasks that may contribute to a goal, provide a response to a notification and/or otherwise be useful to the user. The selection may include ranking the plurality of tasks based on one or more criteria indicating the importance of each task (e.g., in achieving the goals of the user, or otherwise being a matter of importance) and selecting one or more tasks being highly ranked. The criteria may include, for example, the importance (e.g., priority) of each goal of the one or more goals, the importance of each of the one or more notifications, the urgency or time sensitivity of tasks, and other information relating to the user.

Figure 4E:
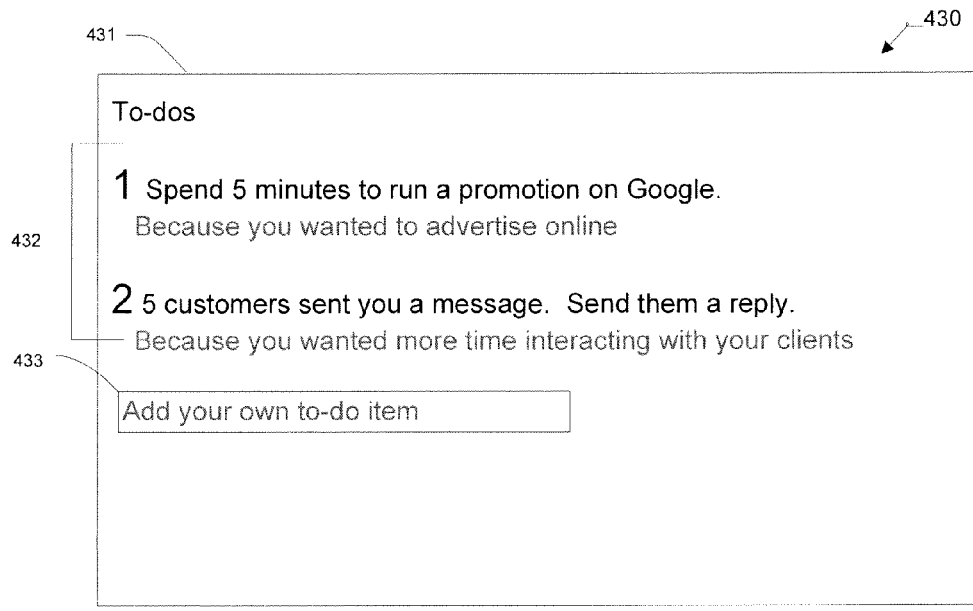

In block 206, the identified one or more tasks are provided for display. FIG. 4E, described in further detail below, illustrates an example graphical user interface provided for display to the user, displaying one or more tasks. In one example, once the to-do list of tasks is provided for display to the user, the user can add one or more additional tasks or to-do items to the to-do list (see FIGS. 4E and 4F). The additional to-do items entered by the user are added to the to-do list and may be used to reprioritize the user's goals and/or generate new goals associated with the user or the business of the user.

Figure 3:
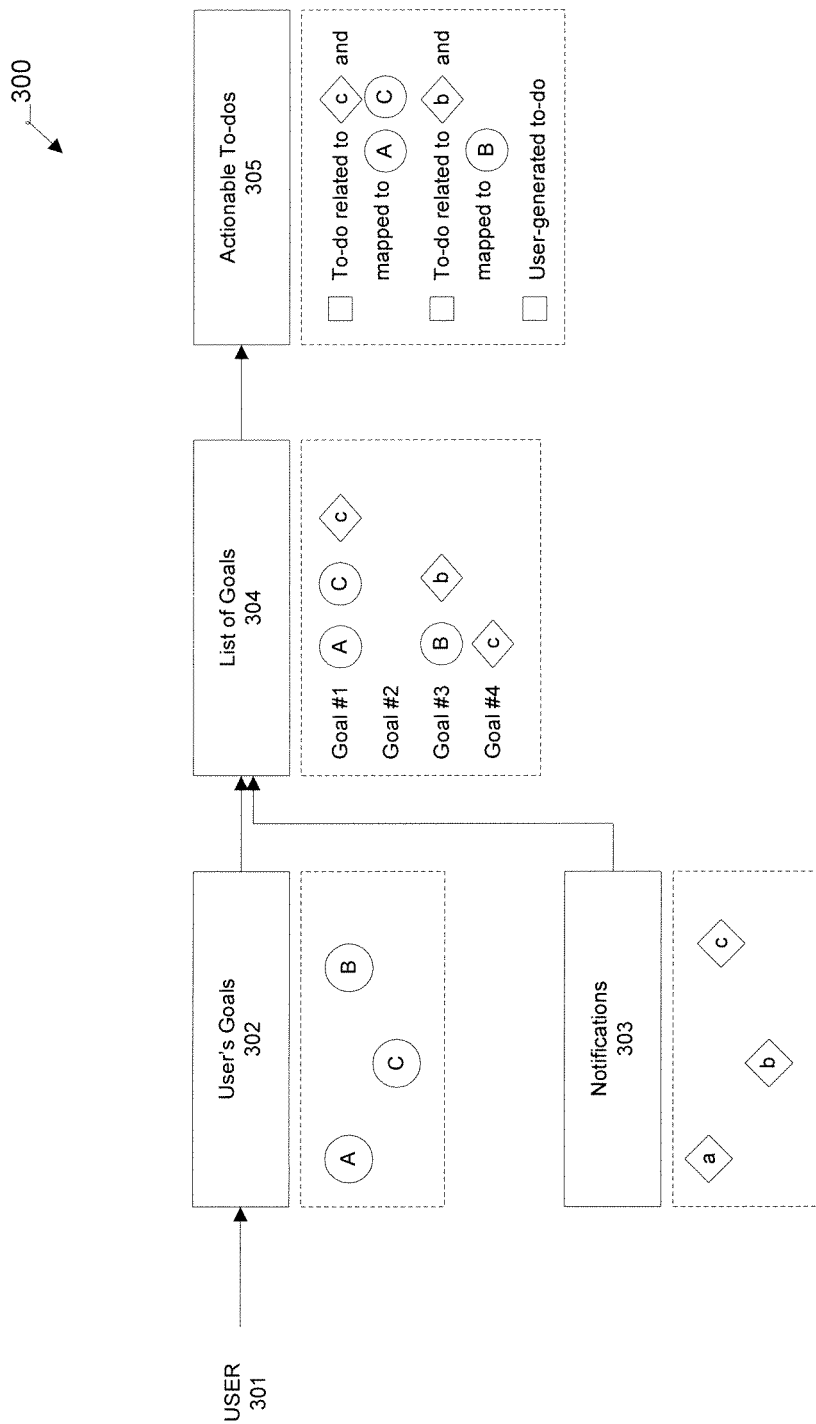
FIG. 3 illustrates a block diagram of an example process for providing a to-do list of tasks to a user.

FIG. 3 illustrates a block diagram of an example process 300 for providing a to-do list of tasks to a user. As shown, a user 301 is associated with one or more goals 302. For exemplary purposes, FIG. 3 illustrates three goals associated with the user, labeled as goals A, B, C. In addition, a user is associated with one or more notifications 303 received by the user, where each notification 303 refers to an event relating to the user or the user's business. For exemplary purposes, FIG. 3 illustrates three notifications associated with the user, labeled as notifications a, b, c.

Based on various criteria, including the user's goals 302, and notifications 303, a list of goals 304 is generated for the user 301. The list of goals may include system generated goals (e.g., based on information regarding the user), user sub goals, as well user goals indicated by the user. One or more of the user's goals 302 and notifications 303 are mapped to one or more goals of the list of goals 304 associated with the user 301. For example, as shown in FIG. 3, goal #1 is mapped to user's goals A and C and notification c, goal #3 is mapped to user's goal B and notification b and goal #4 is mapped to notification c. Goal #2 is not mapped to any goals or notifications, and may be included based on various other criteria including user or business information available.

The list of goals 304 is used to generate one or more actionable to-dos 305. The actionable to-dos may relate to specific notifications and may be mapped to specific user's goals as shown in FIG. 3. In addition to the system generated actionable to-dos, the actionable to-dos may include user-generated actionable to-dos. The user-generated actionable to-dos 305 may be manually entered by user 301 and added to the to-do list provided for display to the user. In one example, the user-generated actionable to-dos may be used as additional input to prioritize the goals within the list of goals and/or to add new goals (or sub goals) to the list of goals.

IV. Example Graphical User Interfaces for Facilitating Providing a User with a To-do List of Tasks FIGS. 4A-4F illustrate example graphical user interfaces that may be displayed to the user to provide the user with a to-do list of tasks. FIG. 4A illustrates an example graphical user interface 410 for querying a user for one or more goals. Graphical user interface 410 may be provided for display to the user when the user first accesses the system, requests to be presented with a to-do task list, a refreshed or updated task list or requests to edit his/her goals. As illustrated, the graphical user interface 410 includes a window 411 displaying a query 412 to the user to select one or more goals. One or more selectable goals 413, 414, 415 and 416 are presented to the user. The selectable goals 413, 414, 415 and 416 may be predefined by the system or selected for the user based on information regarding the user or the user's business. In addition, a text box 417 is provided for the user, the text box 417 providing the user with a mechanism for manually entering a goal that is different from the predefined and/or system selected goals 413, 414, 415, 416. The user may select any of the provided goals 413-416 or may enter a new goal into the text box 417. A "save goals" button 418 is provided to the user to finalize the goal selections by the user.

In one example, in addition to selecting one or more goals, the user may also be able to expand upon a specific goal by selecting one or more sub goals associated with the goal. As described above, the sub goals indicate specific tasks that may contribute to achievement of a more general goal. In one example, upon selection of a goal, the user may automatically be prompted to select one or more sub goals associated with the selected goal. In another example, the user may click on a specific goal or otherwise request to add one or more sub goals. A sub goal selection graphical user interface may be presented to the user to allow the user to select one or more sub goals associated with a specific goal.

FIG. 4B illustrates an example graphical user interface 420 for querying a user for one or more sub goals associated with a goal. The graphical user interface 420 may be provided for display to the user when the user clicks on one of the one or more goals provided in graphical user interface 410. For exemplary purposes graphical user interface 420 displays sub goals associated with goal 413 of the graphical user interface 410 displayed in FIG. 4A. As illustrated, the graphical user interface 420 includes a window 421 displaying a query 422 to the user to select one or more sub goals associated with a goal selected by the user (e.g., goal 413). One or more selectable sub goals 423, 424, 425 and 426 are presented to the user. The selectable sub goals 423, 424, 425 and 426 may be predefined by the system or selected for the user based on information regarding the user or the user's business. In addition, a text box 427 is provided for the user. The text box 427 providing the user with a mechanism for manually entering a sub goal. The user may select any of the provided goals 423-426 or may enter a new goal into the text box 427. A "save" button 428 is provided to the user to finalize the sub goal selections.

FIG. 4C illustrates graphical user interface 420 showing selections by the user of the sub goals associated with a goal. As shown, the user may select one or more of the sub goals after graphical user interface 420 is displayed to the user. In this example, as shown the user has selected goal 424 and 426 and also entered a goal into the text box 427. Once the user selects the goals, the user may then select the save button 428. Upon selection of the save button 428, the user may be redirected to the goal selection graphical user interface 410.

FIG. 4D illustrates graphical user interface 410 showing selections by the user of goals and sub goals associated with one or more goals. As shown, the goal 413 is illustrated as being selected, and sub goals 423 and 426 as well as the manually entered sub goal entered within text box 427 are displayed below the goal. The user may continue by selecting one or more additional goals and/or sub goals. Once the user has completed his goal selection, the user may select the save goals button 418. The selections by the user are then used to provide the user with a to-do list of tasks and/or notifications.

Figure 4F:
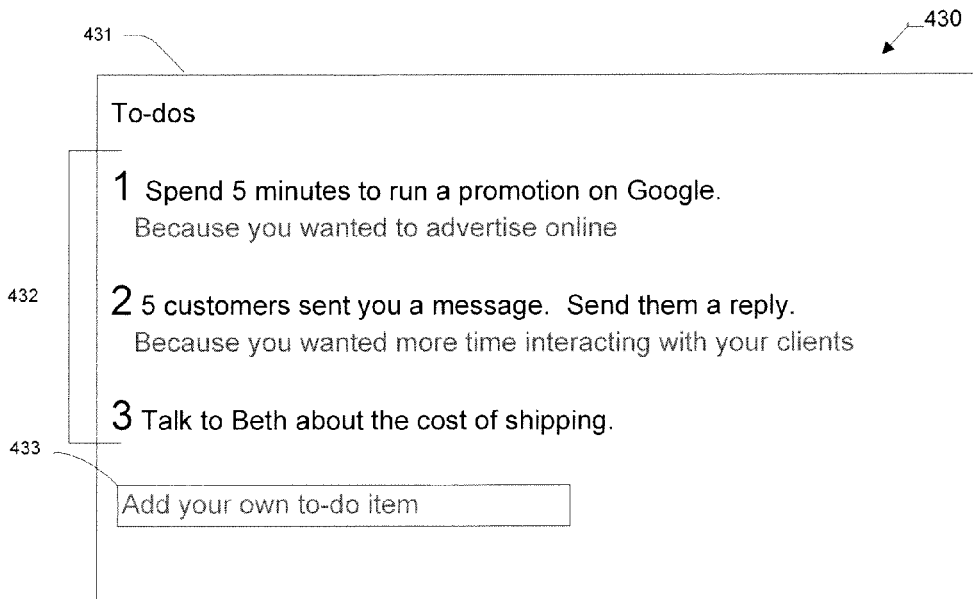

FIG. 4E illustrates an example graphical user interface 430 displaying a to-do list to a user. The graphical user interface 430 includes a window 431 displaying a to-do list 432 and a text box 433. The to-do list includes one or more tasks selected for the user, for example, according to process 200 described above. In addition the selected to-dos, the user may enter one or more manual tasks in the text box 433. FIG. 4F illustrates the example graphical user interface 430 where the to-do list 432 includes an additional to-do 3 entered by the user using the text box 433.

IV. Example System for Facilitating a Providing a User with a To-do List of Tasks Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
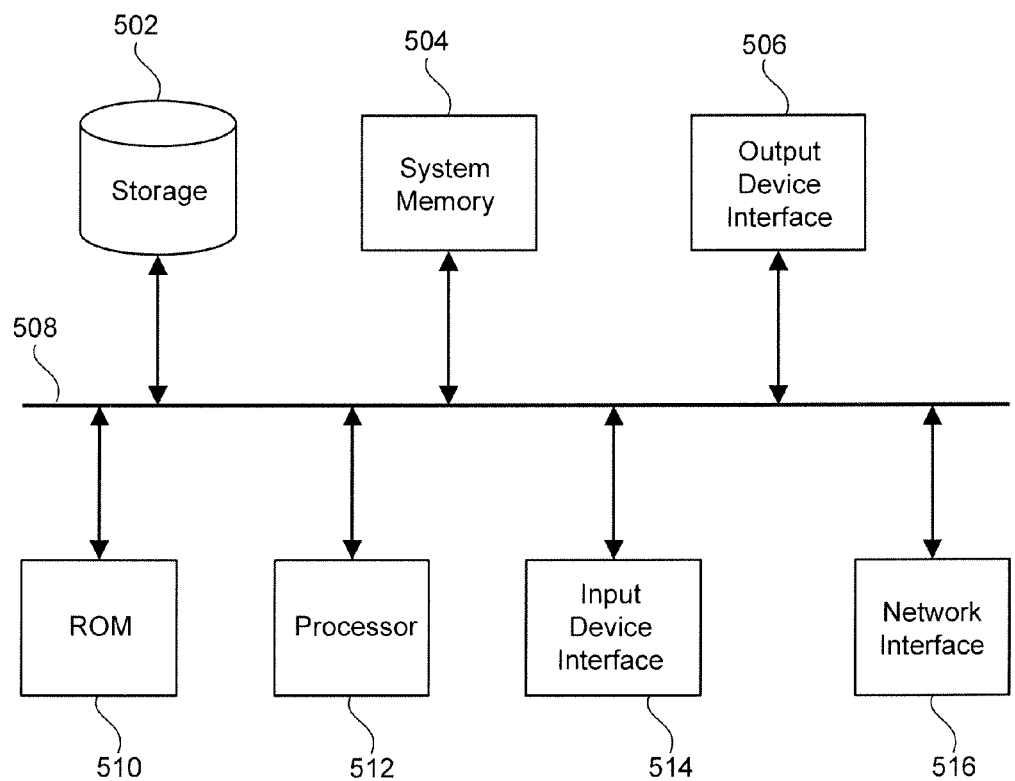
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating providing a user with a to-do list of tasks. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of blocks in the processes disclosed is an illustration of exemplary approaches. Based upon design preferences, it is understood that the specific order or hierarchy of blocks in the processes may be rearranged, or that some illustrated blocks may not be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing a user with a to-do list of tasks, the method comprising:
   determining, using one or more computing devices, one or more goals associated with a user's business, wherein the one or more goals include at least one goal selected by a user, wherein the selection by the user comprises one of the at least one goal being selected by the user from a list of goals provided to the user or the at least one goal being manually entered by the user, the one or more goals comprising objectives that the user wants to achieve for the user's business;
   identifying, using the one or more computing devices, one or more notifications associated with the user's business, each notification notifying the user of an event comprising an action by another user with respect to the user's business, wherein each notification comprises one or more of a message, comment, endorsement, tag, recommendation, share, and review;
   mapping, using the one or more computing devices, the one or more notifications to one or more of the one or more goals, wherein a notification is mapped to a goal when the notification is capable of prompting action by the user that contributes to achieving the goal;
   identifying, using the one or more computing devices, one or more tasks, the one or more tasks contributing to at least one of the one or more goals and providing a response to the event relating to at least one of the one or more notifications; and
   providing, using the one or more computing devices, the one or more tasks for display to the user.

2. The method of claim 1, wherein the identifying the one or more tasks comprises:
   identifying a plurality of tasks, the plurality of tasks associated with the one or more goals, wherein a task is associated with a goal when the task is determined to contribute to achieving the goal; and selecting the one or more tasks from the plurality of tasks.

3. The method of claim 2, wherein the one or more tasks comprises at least one task of the plurality of tasks providing a response to at least one of the one or more notifications.

4. The method of claim 1, further comprising:
wherein the selecting the one or more tasks comprises ranking the plurality of tasks based on one or more criteria, the criteria comprising one or more of number of goals associated with each task, importance of each goal of the one or more goals, number of notifications associated with each task, the importance of each of the one or more notifications, and information relating to the user.

5. The method of claim 1, wherein the one or more goals comprise at least one goal selected by the system based on one or more criteria including previous activities of the user.

6. The method of claim 1, wherein the one or more goals include at least one sub goal associated with a goal, wherein a sub goal comprises a specific method of achieving the goal.

7. The method of claim 1, further comprising:
providing the user with a mechanism for entering one or more tasks.

8. The method of claim 7, wherein the one or more tasks are used to prioritize the one or more goals.

9. The method of claim 1, wherein each of the one or more goals is associated with a priority, the priority indicating the importance of the goal to the user.

10. The method of claim 9, wherein the identifying the one or more tasks is based on the priority of the one or more goals.

11. The method of claim 1, further comprising:
identifying at least one tool for performing at least one task of the one or more tasks; and
providing the at least one tool to the user in association with the at least one task.

12. The method of claim 11, further comprising:
receiving a selection of the at least one task by the user; and
launching the at least one tool for performing the at least one task.

13. A system for providing a user with a to-do list of tasks, the system comprising:
one or more processors; and
a machine-readable medium comprising instructions stored therein, which when executed by the processors, cause the processors to perform operations comprising:
determining one or more goals associated with a user's business, wherein the one or more goals include at least one goal selected by a user, wherein the selection by the user comprises one of the at least one goal being selected by the user from a list of goals provided to the user or the at least one goal being manually entered by the user, the one or more goals comprising objectives that the user wants to achieve for the user's business;
identifying one or more notifications associated with the user's business, each notification notifying the user of an event comprising an action by another user with respect to the user's business, wherein each notification comprises one or more of a message, comment, endorsement, tag, recommendation, share, and review;
mapping the one or more notifications to one or more of the one or more goals, wherein a notification is mapped to a goal when one or more of the event corresponding to the notification or response to the event corresponding to the notification contribute to achieving the goal; and
identifying one or more tasks, wherein the one or more tasks comprise at least one task that provides a response to a notification mapped to at least one of the one or more goals; and
providing the one or more tasks for display to the user.

14. The system of claim 13, wherein each of the one or more goals is associated with a priority, the priority indicating the importance of the goal to the user, wherein the identifying the one or more tasks is based on the priority of the one or more goals.

15. The system of claim 13, wherein the one or more goals include at least one sub goal associated with at least one of the one or more goals, wherein a sub goal is associated with a goal if the sub goal comprises a specific method of achieving the goal.

16. A machine-readable medium comprising instructions stored therein, which when executed by a machine, cause the machine to perform operations comprising:
determining one or more goals associated with a user's business, wherein the one or more goals include at least one goal selected by a user, wherein the selection by the user comprises one of the at least one goal being selected by the user from a list of goals provided to the user or the at least one goal being manually entered by the user, the one or more goals comprising objectives of the user that the user wants to achieve for the user's business;
identifying one or more notifications associated with the user's business, each notification notifying the user of an event comprising an action by another user with respect to the user's business, wherein each notification comprises one or more of a message, comment, endorsement, tag, recommendation, share, or review;
mapping the one or more notifications to one or more of the one or more goals, wherein a notification is mapped to a goal when the notification is capable of prompting action by the user that contributes to achieving the goal;
identifying one or more tasks, the one or more tasks each contributing to at least one of the one or more goals or providing a response to the event relating to at least one of the one or more notifications; and
providing the one or more tasks for display to the user.

17. The machine readable medium of claim 16, wherein the identifying the one or more tasks comprises:
identifying a plurality of tasks, the plurality of tasks associated with the one or more goals, wherein a task is associated with a goal when the task is determine to contribute to achieving the goal; and
selecting the one or more tasks from the plurality of tasks, wherein the one or more tasks comprises at least one task of the plurality of tasks providing a response to at least one of the one or more notifications.

* * * * *